United States Patent Office 3,405,420
Patented Oct. 15, 1968

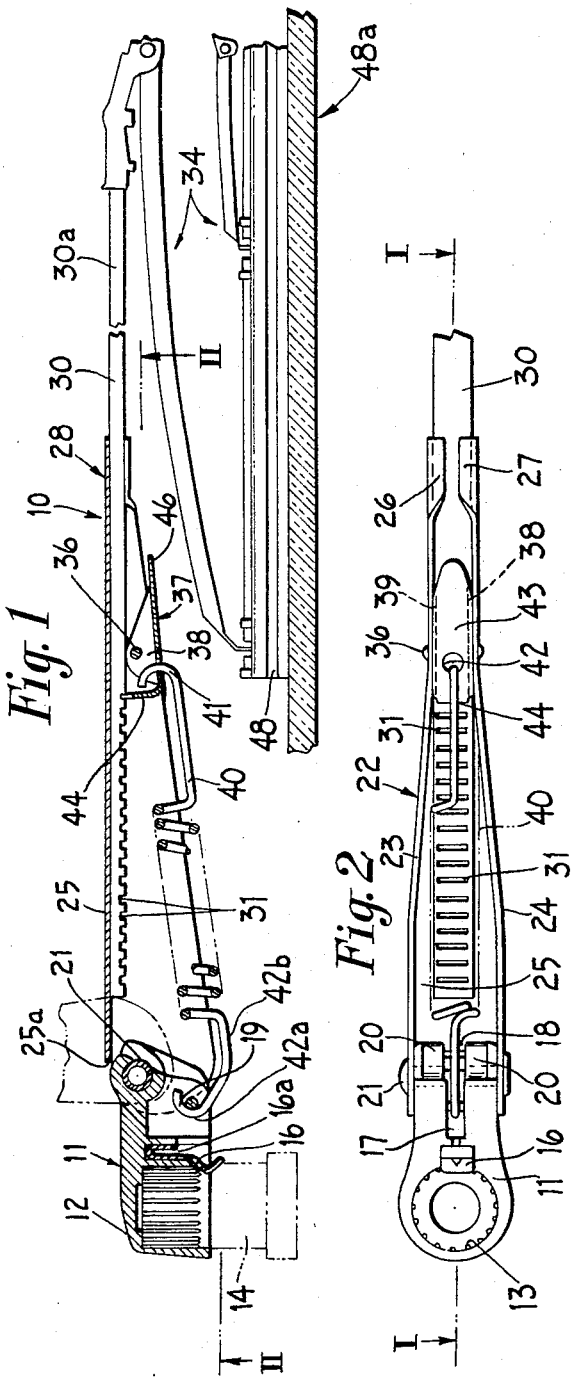

3,405,420
WIPER ARMS
Phillip Geoffrey Kent Smithers, Cranford, and Peter Mower, Whitton, Twickenham, England, assignors to Trico Products Corporation, Buffalo, N.Y., a corporation of New York
Filed July 26, 1966, Ser. No. 567,896
Claims priority, application Great Britain, July 27, 1965, 32,070/65
3 Claims. (Cl. 15—250.35)

ABSTRACT OF THE DISCLOSURE

A windshield wiper arm adjustable in length in which an outer arm section is telescopically received within an inner arm portion. A pivoted spring biased latching detent mounted on the inner arm section engages notches provided on the outer arm section to retain the inner and outer arm sections in their adjusted position. The spring for biasing the latch also serves as the biasing spring to urge the arm against the windshield.

---

This invention relates to windshield wiper arms which are adjustable in length.

An arm according to the present invention comprises a hub, an inner arm portion pivoted to the hub, an outer arm portion telescopically fitted into the inner portion, a pivoted latch member carried by the inner portion, and a spring extending between the hub and the latch member, the latch member having a detent which, by the action of the spring, is normally urged into locking engagement with the outer arm portion, and having a finger piece which can be pressed by a user so as to tilt the latch member against the action of the spring so as to release the detent from the outer arm portion, the spring also serving to urge the inner arm portion to swing around its pivot relatively to the hub and thereby press a wiper blade unit against a windshield.

Further features of the invention will be apparent from the following description of examples of the invention, reference being made to the accompanying drawings in which:

FIG. 1 is a part-section on the line I—I of FIG. 2 of one arm according to the invention; and FIG. 2 is a plan view in the direction of the arrows II—II of FIG. 1.

Referring to FIGS. 1 and 2, a windshield wiper arm is indicated generally at 10 and comprises a hub 11 having a closed surface 12 and a bore 13 therein which has circumferentially spaced narrow axial ribs and is adapted to receive a shaft indicated diagrammatically at 14, which shaft is in use oscillated by a motor (not shown). The motor can be electric, pneumatic, or hydraulic and is usually at a distance and operates the shaft through a linkage or cable device. Means 16, comprising a spring blade located in a recess 16a in the hub, are provided for holding the hub 11 to the shaft 14. An extended portion of the hub 11 has slots 17, 18 therein. A pin 19 is fixed across the slot 17. The arms 20 defining a part of the slot 18 are shaped to firmly receive a pin 21 by which an inner portion 22 of the arm is pivoted relative to the hub 11.

The inner portion 22 may be of tapering channel section, as illustrated, or of other suitable form, having flanges or side walls 23, 24 and a web portion or top wall 25, and may be made of sheet metal. The flanges 23, 24 are bent together near the narrower outer end, as shown at 26, 27, to form a short tubular portion 28 of rectangular section.

An outer portion 30 of the arm is telescopically fitted into the rectangular portion 28 and comprises a piece of strip metal, of rectangular cross section. The underface of the portion 30 in a region adjacent to one end of the outer arm portion 30 is formed with a number of pairs of longitudinally spaced opposed shoulders forming transverse recesses or latching receptors 31 extending across the whole width of the underface and spaced apart along the length of the outer portion 30. In accordance with the broader aspects of the invention, other forms of latching receptors may be utilized. In a preferred alternative the recesses 31 extend across only a major part of the underface of the portion 30 leaving equal unrecessed portions between the ends of the recesses and the edges of the portion 30.

Hinged to the outer end of the outer portion 30 is a wiper blade unit indicated generally at 34 and comprising the usual harness, backing strip and rubber.

A pin 36 extends between the flanges or side walls 23, 24 of the inner arm portion 22 and a latch member 37 is pivoted on the pin 36.

The latch member 37 is of channel section and lies between the flanges 23, 24 and with its flanges 38, 39 directed towards the web 25. The pin 36 extends through all the flanges 23, 24, 38 and 39 and is located about one third of the length of the latch member 37 from its inner end, i.e. its end nearer the hub 11.

A tension spring 40 has one end 41 hooked into a hole 42 in the web 43 of the latch member 37, the hole 42 being nearer the inner end of the latch member than the pin 36. The other end 42a of the spring 40 is hooked round the pin 19.

The latch member 37 has a prolongation 44 of the inner end of its web 43, the prolongation 44 being bent 90° towards the web 25 forming upstanding means. The outer end or upstanding means of the prolongation 44 serves as a locking detent which can enter the recesses 31 in firm locking engagement.

The outer end 46 of the latch member protrudes slightly from the flanges or side walls 23, 24 of the inner arm portion 22 and serves as a finger piece which can be pressed by a user so as to tilt the latch member 37 (anti-clockwise as seen in FIG. 1), against the action of the spring 40, and so release the detent 44 from locking engagement with the outer arm portion 30. It will be understood that the spring 40 normally urges the detent into locking engagement with one of the recesses 31 in the outer arm portion, the surface 30a of the outer arm portion lying against the inner face of the web 25. The spring 40 also serves to urge the inner portion 22 to swing around its pivot 21 relatively to the hub 11 and thereby press the rubber 48 of the wiper blade unit 34 against a windshield of a motor vehicle, which windshield is indicated diagrammatically at 48a in FIG. 1.

With this arrangement, when it is desired to adjust the length of the windshield wiper arm, a user depresses the finger portion 46, thus moving the detent 44 out of a recess 31 and then pulls the arm portion 30 outwardly or pushes it inwardly, relatively to the inner arm portion 22 to a desired position and then releases the finger portion 46 whereupon the detent 44 enters another recess 31. In the position shown in FIG. 1 with the detent 44 engaged in a recess 31, it is not possible for the user to grasp the portion 30 and slide it outwardly or inwardly relatively to the portion 22. Also, it is not possible for centrifugal forces or wind forces to overcome the detent and this is particularly important with modern larger and heavier wiper blade units.

In a preferred arrangement, the proportions of the parts, and the properties of the spring 40, are such that whereas the finger piece 46 can be moved by the pressure of a user's finger when the wiper unit 34 is against a windshield, lifting of the wiper unit away a considerable distance from the screen 48a, for example to the position shown in chain line FIG. 1, in which the length of a part 42b of the spring lies in the stop 18, increases the force of the spring 40 on the latch member 37 so much that the finger piece 46 can only be moved by a user by the application of a considerable, deliberate force. This ensures that the length of the arm can not be inadvertently adjusted during cleaning of the windshield by hand.

Also, the proportions are preferably such that the spring 40 passes a "dead center" position as the arm is swung away from a windshield, so that the arm will stay in a swung out position until deliberately swung back. After the arm passes through the dead center position to the position shown in chain lines, the end 25a of the inner portion 25 will abut the surface 12 which acts as a stop.

For example, in the rest position, and in the case of a medium sized car, the distance between the axes of pins 19, 36 may be 3 7/16 inch, the distance between pins 21, 36 may be 3 3/16 inch, and the rating of the spring may be 100 pounds per inch extension. In the working position, shown in FIG. 1, the spring is slightly extended. The tension in the spring in this position is for example 35 pounds.

For a large vehicle these values would be increased and for a smaller vehicle reduced. With each arrangement of inner portion and associated parts, a number of outer portions of different lengths may be used; for example in the case of the proportions set out above, outer portions having lengths in the range 6 to 14 inches could be used.

Also in each case the spring may be replaced by another spring of equal length but different rating.

Thus with only a few sizes of hub, inner portion and associated parts, together with a large number of outer portions of different lengths, a wide range of wiper arms, suitable for a wide range of vehicles, may be constructed. With the customary wiper arm comprising a single member extending between hub and wiper blade unit, a large number of different separate wiper arms are required for a wide range of vehicles.

Although a certain specific embodiment of the invention has been shown and described for the purpose of illustration, it will be apparent that in its broader aspects, various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A windshield wiper arm comprising a hub, an inner arm portion having side walls pivoted to the hub, an outer arm portion telescopically fitted into the inner arm portion, a pivoted latch member of channel section lying between the side walls of the inner arm portion, a pivot pin passing transversely through said side walls of said inner arm portion and the legs of said channel section disposed approximately one-third of the length of the latch member from its inner end, a spring secured at one end adjacent the inner end of the latch member and at the other end to the hub, said pivoted latch member having upstanding means adjacent its inner end, said outer arm portion having a plurality of longitudinally spaced opposed shoulders forming latching receptors therebetween, said upstanding means being biased to firm locking engagement with the outer arm portion within said latching receptors between a pair of said opposed shoulders by said spring and a manually operable finger piece disposed adjacent the outer end of the latch member for tilting the latch member against the action of said spring to release the upstanding means from locking engagement with the outer arm portion, said spring means also serving to urge the inner arm portion to swing around its pivot relative to the hub to thereby urge a wiper blade unit against a windshield.

2. A windshield wiper arm according to claim 1 wherein said upstanding means of said latch member comprises a prolongation of the inner end of its web bent through substantially 90° toward said latching receptors.

3. A windshield wiper arm according to claim 2 wherein said finger piece comprises a prolongation of the outer end of its web, said prolongation protruding slightly from the side walls of the inner arm portion.

References Cited

UNITED STATES PATENTS 2,918,690  12/1959  Krohm _____ 15—250.35 X

FOREIGN PATENTS 712,044  7/1954  Great Britain.

CHARLES A. WILLMUTH, *Primary Examiner.*